(12) United States Patent
Tsai et al.

(10) Patent No.: US 6,453,829 B1
(45) Date of Patent: Sep. 24, 2002

(54) INCINERATOR ASSEMBLY HAVING WASTE SMOKE TREATING DEVICE

(76) Inventors: Wu Chin Tsai, No. 379-5, Ben Guan Road, Niau Song Hsiang, Kaoshiung Hsien (TW), 833; Sin Hua Chen, No. 123, Sec. 3, Da Sue Road, Dou Liou City, Yuen Lin Hsien (TW), 640

( * ) Notice: Subject to any disclaimer, the term of this patent is extended or adjusted under 35 U.S.C. 154(b) by 0 days.

(21) Appl. No.: 09/967,383

(22) Filed: Oct. 1, 2001

(51) Int. Cl.[7] .............................. F23G 7/06; F23J 15/00; F23B 1/12
(52) U.S. Cl. ................... 110/203; 110/295; 110/233; 110/234; 110/204; 110/211; 110/101 R
(58) Field of Search ........................... 110/295, 296, 110/233, 234, 203, 204, 210, 211, 101 R; 55/434, DIG. 30; 96/350, 366, 369, 347

(56) References Cited

U.S. PATENT DOCUMENTS

| | | | | |
|---|---|---|---|---|
| 2,484,277 A | * | 10/1949 | Fisher | 183/24 |
| 2,491,645 A | * | 12/1949 | Clark et al. | 183/24 |
| 3,485,015 A | * | 12/1969 | Vecchio | 3/196 |
| 3,624,696 A | * | 11/1971 | Cohen | 55/223 |
| 4,699,071 A | * | 10/1987 | Vier et al. | 110/345 |
| 4,739,713 A | * | 4/1988 | Vier et al. | 110/263 |
| 5,237,939 A | * | 8/1993 | Spokoyny et al. | 110/345 |
| 5,279,234 A | * | 1/1994 | Bender et al. | 110/210 |
| 5,309,850 A | * | 5/1994 | Downs et al. | 110/235 |
| 5,762,006 A | * | 6/1998 | Ubaldi et al. | 110/235 |
| 5,873,930 A | * | 2/1999 | Sanchez | 96/278 |

* cited by examiner

Primary Examiner—Ira S. Lazarus
Assistant Examiner—K. B. Rinehart
(74) Attorney, Agent, or Firm—Charles E. Baxley

(57) ABSTRACT

An incinerator device includes an incinerator for burning the garbage to generate a smoke, the smoke has a portion sent back to and retreated by the incinerator, and the other portion sent to and retreated by a furnace. The furnace may energize a steam boiler to actuate an electric generator and to generate electricity. A filtering device includes a serpentine conduit for receiving the smoke from the furnace, and disposed in a casing for heating the water in the casing and for supplying the heated water for family use or for use in swimming pool or the like.

11 Claims, 3 Drawing Sheets

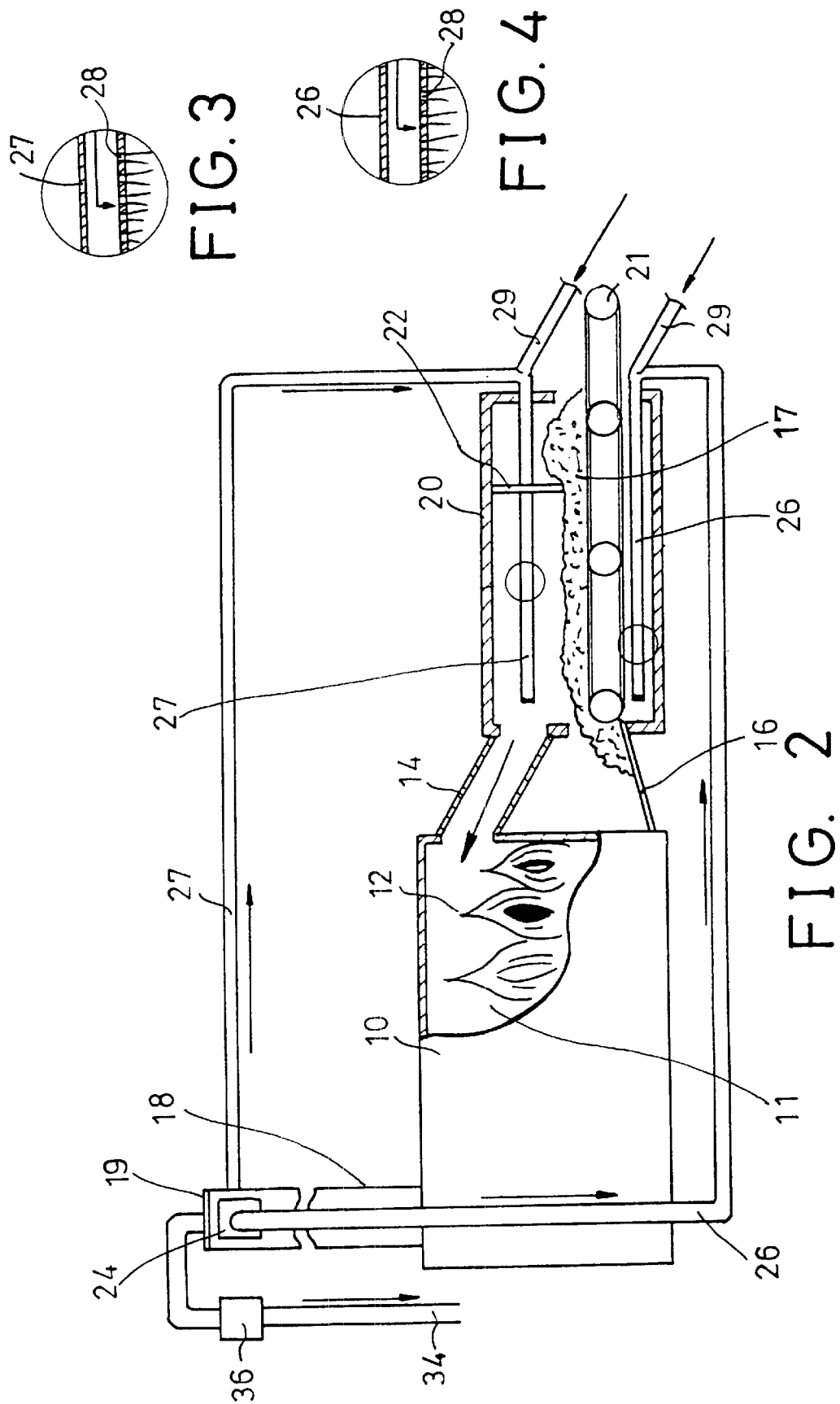

INCINERATOR ASSEMBLY HAVING WASTE SMOKE TREATING DEVICE

BACKGROUND OF THE INVENTION

1. Field of the Invention

The present invention relates to an incinerator, and more particularly to an incinerator assembly having a device for treating the waste or exhaust gas and smoke generated by the incinerator.

2. Description of the Prior Art

Typical incinerators may be used for burning the wastes or the garbages or the like, and may generate a large quantity of smoke, particles, ashes, bad odors, and even poisonous gases, and the like, which may badly pollute our environment. People therefore do not want the incinerators to be built near their land.

The present invention has arisen to mitigate and/or obviate the afore-described disadvantages of the conventional incinerators.

SUMMARY OF THE INVENTION

The primary objective of the present invention is to provide an incinerator assembly including a device for treating the waste or exhaust gas and smoke generated by the incinerator and for preventing the smoke from flowing or polluting our environment.

The other objective of the present invention is to provide an incinerator assembly including a device for reducing the quantity of the particles or ashes and for collecting the particles or ashes from the smoke.

The further objective of the present invention is to provide an incinerator assembly including a device for using the heat generated by the incinerator to generate the electricity or to power the other facilities or the like.

In accordance with one aspect of the invention, there is provided an incinerator assembly comprising an incinerator for burning an object to generate a smoke, and including at least one port, and including an upper portion, a furnace, means for furnishing the smoke generated by the incinerator to the furnace and to be treated by the furnace, and means for filtering the smoke flowing through the furnace.

The furnace includes a heater for heating the smoke received therein. A steam boiler may be disposed above the furnace and actuated by the furnace to generate a steam. An electric generator may further be provided and coupled to the steam boiler for being actuated by the steam boiler to generate electricity.

A device may further be provided for supplying the smoke generated by the incinerator backward into the upper portion of the incinerator again and includes a tube having a first end coupled to the at least one port of the incinerator, and having a second end directed toward the upper portion of the incinerator. A blower device may be coupled to the tube for drawing the smoke out of the incinerator.

A conveyer may be disposed in front of the incinerator for supplying the object into the incinerator. A housing is disposed in front of the incinerator for receiving the conveyer, the housing includes a plate directed toward the conveyer for engaging with and for evenly spreading the object.

The furnace includes a casing, the furnishing means includes a pipe having a first end coupled to the at least one port of the incinerator, and having a second end coupled to the casing, for furnishing the smoke generated by the incinerator to the casing of the furnace. A blower device is coupled to the pipe for drawing the smoke out of the incinerator.

The filtering means includes a serpentine conduit having a first end coupled to the furnace for receiving the smoke from the furnace, and a duct coupled to the lower portion of the serpentine conduit for receiving water to filter the smoke.

The filtering means includes a receptacle for receiving water, the serpentine conduit is engaged in the water of the receptacle for allowing the smoke to heat the water of the receptacle. A hot water container is further provided and coupled to the receptacle for receiving the heated water from the receptacle.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a partial cross sectional view taken along lines 2—2 of FIG. 1;

FIGS. 3 and 4 are enlarged partial cross sectional views showing the tubes for guiding the smoke into the incinerator.

DETAILED DESCRIPTION OF THE PREFERRED EMBODIMENT

Figure 1:
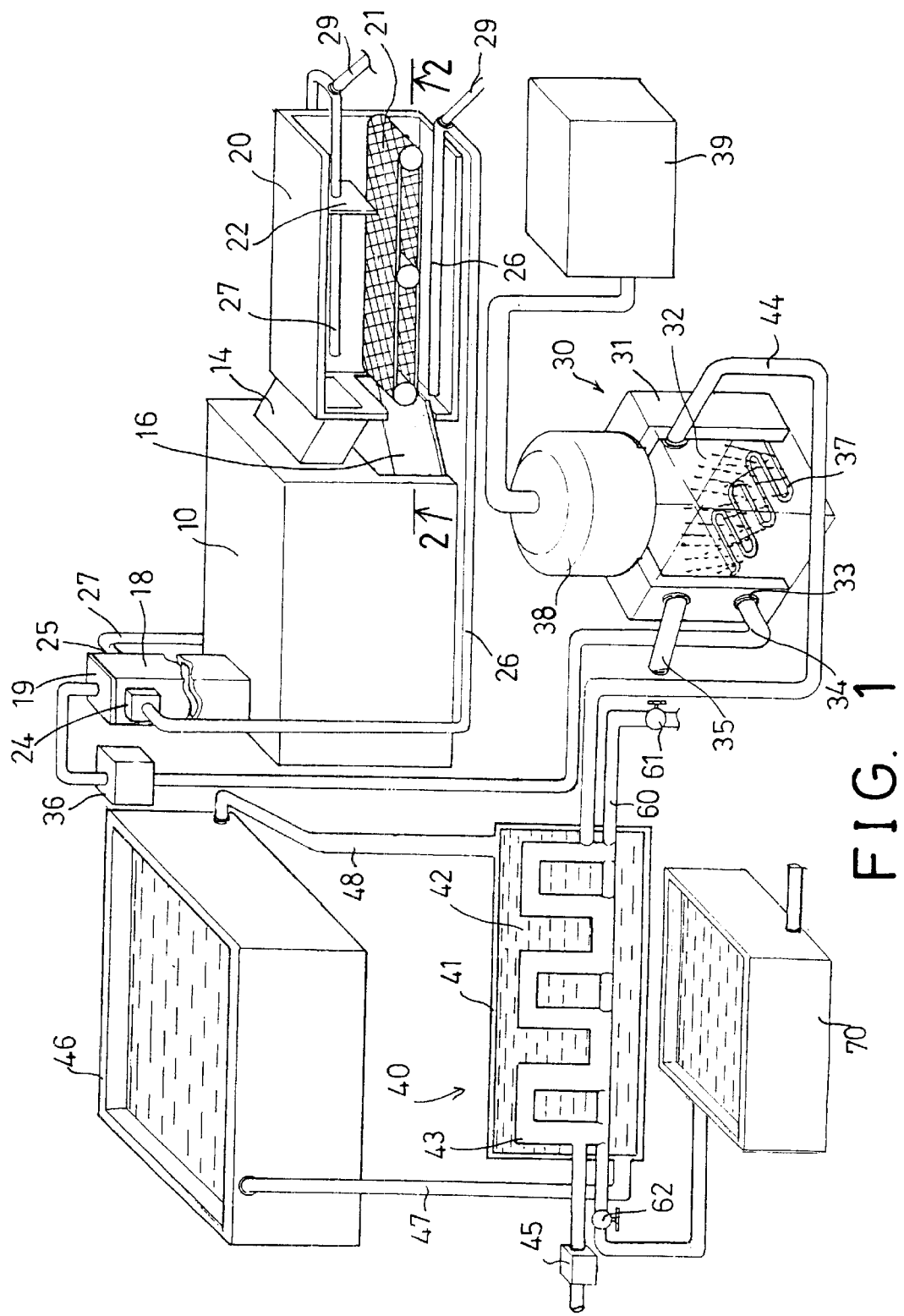
FIG. 1 is a perspective view of an incinerator assembly in accordance with the present invention.

Referring to the drawings, and initially to FIGS. 1 and 2, an incinerator assembly in accordance with the present invention comprises a typical incinerator 10 including a chamber 11 formed and provided therein for receiving the waste or the garbage 17 or the like to be ignited or burned by the fire or flame generated or provided in the incinerator 10. The chamber 11 includes an upper portion 12. A duct 14 is coupled to the incinerator 10 and directed toward the upper portion 12 of the chamber 11 of the incinerator 10. A ramp 16 is coupled to the incinerator 10 and directed toward the lower or bottom portion of the chamber 11 of the incinerator 10 for directing the waste or the garbage 17 or the like to be ignited or burned by the incinerator 10.

The incinerator assembly includes a housing 20 disposed in front of the incinerator 10, a conveyer device 21 disposed in the housing 20 and directed toward the ramp 16 for conveying and directing the garbage 17 toward the ramp 16 and thus directed the garbage 17 toward the lower or bottom portion of the chamber 11 of the incinerator 10. The duct 14 is preferably coupled between the upper portion 12 of the incinerator 10 and the upper portion of the housing 20. A barrier or a plate 22 is disposed in the housing 20, and attached to the upper portion of the housing 20, for example, or dependent downward from the upper portion of the housing 20, and spaced away from the conveyer device 21 for a suitable or predetermined distance, best shown in FIG. 2, for uniformly spreading the garbage 17 along the conveyer device 21, and for allowing the garbage 17 to be evenly conveyed and sent to the incinerator 10.

One or more chimneys or ports 18 are disposed on or extended upward from the upper portion of the incinerator 10, and each includes a cap 19 disposed or secured on top thereof for preventing the smoke from directly entering into the environment. One or more, such as two blast fans or blower devices 24, 25 are disposed or attached or coupled to the upper portions of the ports 18 for drawing the smoke out of the incinerator 10. One or more, such as two tubes 26, 27 have one end coupled to the blower devices 24, 25 respectively, and the other end extended inward of the housing 20 and arranged in the lower and the upper portions of the housing 20 respectively for directly or supplying the smoke of high temperature from the ports 18 into the housing 20, and for preheating the garbage, and such as for dehydrating the garbage before the garbage entering into the incinerator 10. The upper tube 27 is preferably directed toward the duct 14 for directing or supplying the smoke into the incinerator 10, and for allowing the smoke to be burned or treated again by the incinerator 10.

As best shown in FIGS. 3 and 4, the tubes 26, 27 each includes a number of orifices 28 formed therein and directing downward for allowing the smoke to flow downward and outward of the tubes 26, 27 respectively, and for allowing the smoke to be seen by the operators. The operators may thus examine whether the orifices 28 of the tubes 26, 27 have been blocked or not, and may check whether the smoke have been supplied into the housing 20 and into the incinerator 10 or not. The smoke from the orifices 28 of the upper tube 27 may be directed toward the garbage 17 for preheating the garbage 17. One or more conduits 29 may further be provided and coupled to the tubes 26, 27 respectively, for supplying the oxygen or the pressurized air into the housing 20 and/or the incinerator 10, and for facilitating the burning of the garbage 17.

The incinerator assembly further includes a furnace 30 having a casing 31, and having a chamber 32 formed or provided in the casing 31, and having an inlet 33 coupled to the ports 18 or coupled to the caps 19 of the ports 18 with a pipe 34 and a blast fan device or a blower device 36 which may draw the smoke from the chimneys 18 toward and inward the chamber 32 of the casing 31 of the furnace 30. The furnace 30 includes a burner or a heater 37 disposed or provided in the casing 31 for further burning or heating or treating the smoke from the incinerator 10. A boiler, or a steaming generator, or a steam boiler 38 or the like may further be provided and disposed above the furnace 30 and may be energized by the furnace 30 to generate steam. The steam generated by the steam boiler 38 may be supplied to a turbo generator, a turbine generator, or a steam turbo generator 39 for generating electricity.

The electricity generated by the steam turbo generator 39 may be used to power the electric facilities of the incinerator assembly which includes at least the heater 37. In addition, the smoke supplied into the furnace 31 by the blower device 36 may be burned or heated or treated again by the heater 37, such that the quantity of the particles or ashes of the smoke may further be reduced. An oxygen reservoir or a pressurized air reservoir (not shown) may further be provided and coupled to a mouth 35 of the casing 31 for supplying the oxygen or the pressurized air into the casing 31 and for facilitating the burning of the smoke.

Figure 5:
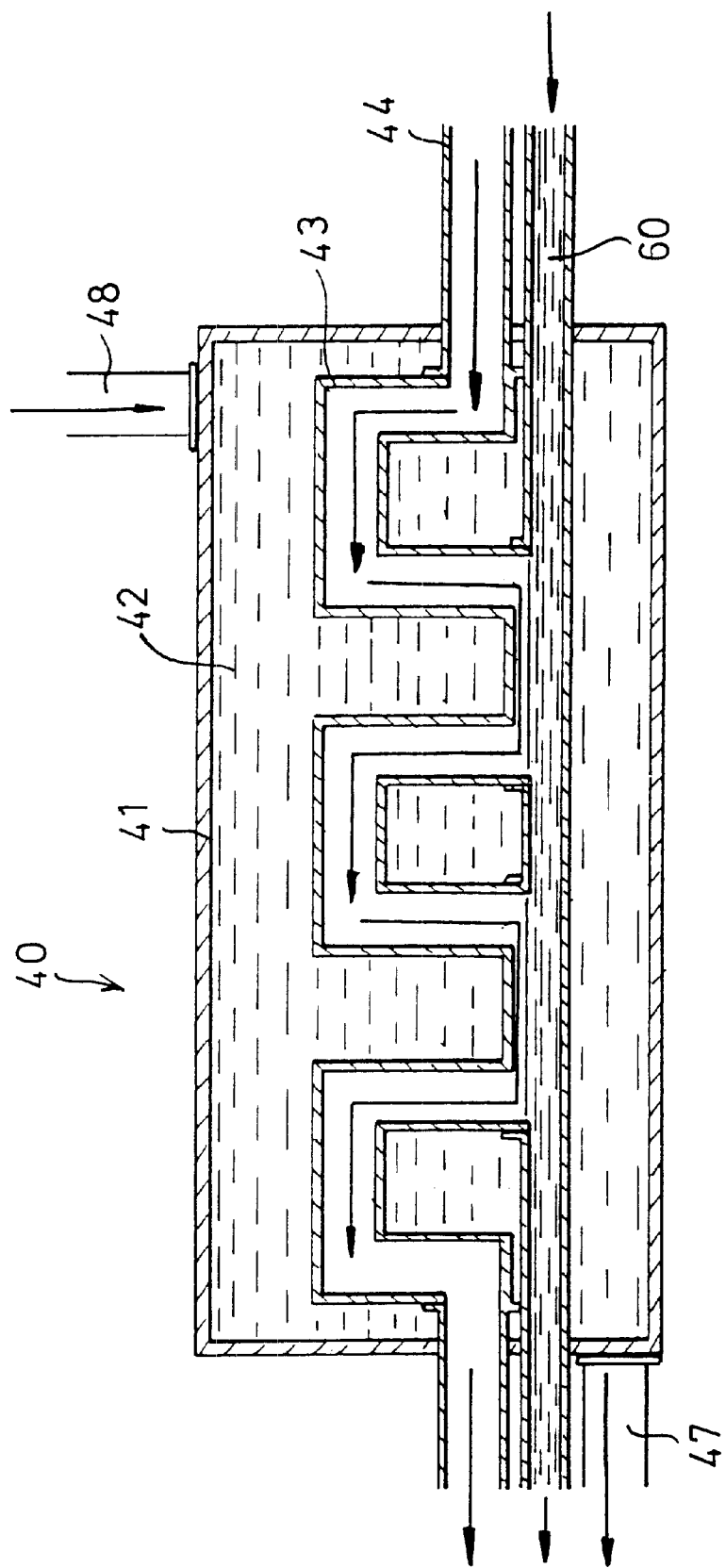
FIG. 5 is an enlarged partial cross sectional view showing the device for collecting the smoke particles, the ashes or the like generated by the incinerator.

Referring next to FIG. 5 and again to FIG. 1, the incinerator assembly further includes a heat exchanger and/or a dust collector 40 having a receptacle 41 for receiving such as the water 42 therein. A serpentine conduit 43 is disposed in the receptacle 41 and includes one or more n-shaped or inverted U-shaped portions and includes one end coupled to the casing 31 with a tube 44, for receiving the reheated smoke from the casing 31 of the furnace 30. The reheated smoke thus may flow through the serpentine conduit 43 to heat the water 42 received in the receptacle 41, and may be drawn out through the serpentine conduit 43 with such as a blast fan device or a blower device 45 or the like. The heated water 42 may be supplied to a swimming pool or a hot water container 46 for family use or the like via a hose 47, and the water from the hot water container 46 may also be supplied into the receptacle 41 again with the other hose 48, for allowing the water to be circulated and heated by the heat exchanger and/or the dust collector 40.

A duct 60 is further provided and disposed in and extended through the receptacle 41, and coupled to the lower or bottom portions of the n-shaped or inverted U-shaped portions of the serpentine conduit 43. The duct 60 includes one end coupled to a water reservoir or the like with a valve 61, and the other end coupled to a sewage treating vessel 70 or the like with the other valve 62. The water from the water reservoir may thus flow through the duct 60 and flow to the sewage treating vessel 70. The reheated smoke from the casing 31 and the tube 44 may be drawn through the serpentine conduit 43 by the blower device 45, and may thus be forced to flow through the water flowing through the duct 60. The particles, the ashes, the dusts, or the like of the smoke may thus be collected by the water that flows through the duct 60, such that the smoke may be cleaned or filtered by the water that flows through the duct 60, and such that the cleaner air may be drawn out to the environment by the blower device 45.

In operation, as shown in FIG. 1, the smoke generated by the incinerator 10 may be partially supplied into the incinerator 10 again by the tube 27, for allowing the smoke to be burned or treated again. Some of the smoke may be drawn into the furnace 30 for being heated and treated again and for energizing the steam boiler 38 which may then energize the steam turbo generator 39 to generate electricity and to power the incinerator assembly. The reheated smoke from the furnace 30 may flow through a heat exchanger and/or a dust collector 40 for heating the water, and/or for filtering the particles and the ashes and the dusts from the smoke, and for allowing the filtered air to flow into the environment.

The sewage contained in the sewage treating vessel 70 may be treated again to obtain the clean water, and to dehydrate the dirt which may then be supplied into the incinerator 10 again for being burned or heated again within the incinerator 10.

Accordingly, the incinerator assembly may retreat the smoke generated by the incinerator for preventing the smoke from flowing or polluting our environment, and for reducing the quantity of the particles or ashes and for collecting the particles or ashes from the smoke, and/or for using the heat generated by the incinerator to generate the electricity or to power the other facilities or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An incinerator assembly comprising:
   an incinerator for burning an object to generate a smoke, and including at least one port, and including an upper portion,
   a furnace,
   means for furnishing the smoke generated by said incinerator to said furnace and to be treated by said furnace,
   means for filtering the smoke flowing through said furnace, said filtering means including a serpentine conduit having a first end coupled to said furnace for receiving the smoke from said furnace and having a lower portion, and a duct coupled to said lower portion of said serpentine conduit for receiving water to filter the smoke, and said filtering means including a receptacle for receiving water, said serpentine conduit being engaged in the water of said receptacle for allowing the smoke to heat the water of said receptacle, and a hot water container coupled to said receptacle for receiving the heated water from said receptacle.

2. The incinerator assembly according to claim 1, wherein said furnace includes a heater for heating the smoke received therein.

3. The incinerator assembly according to claim 1 further comprising a steam boiler disposed above said furnace and actuated by said furnace to generate a steam.

4. The incinerator assembly according to claim 3 further comprising an electric generator coupled to said steam boiler for being actuated by said steam boiler to generate electricity.

5. The incinerator assembly according to claim 1 further comprising means for supplying the smoke generated by said incinerator backward into said upper portion of said incinerator again.

6. The incinerator assembly according to claim 5, wherein said supplying means includes a tube having a first end coupled to said at least one port of said incinerator, and having a second end directed toward said upper portion of said incinerator.

7. The incinerator assembly according to claim 6 further comprising a blower device coupled to said tube for drawing the smoke out of said incinerator.

8. The incinerator assembly according to claim 1 further comprising a conveyer disposed in front of said incinerator for supplying the object into said incinerator.

9. The incinerator assembly according to claim 8 further comprising a housing disposed in front of said incinerator, said conveyer being disposed in said housing, said housing including a plate directed toward said conveyer for engaging with and for evenly spreading the object.

10. The incinerator assembly according to claim 1, wherein said furnace includes a casing, said furnishing means includes a pipe having a first end coupled to said at least one port of said incinerator, and having a second end coupled to said casing, for furnishing the smoke generated by said incinerator to said casing of said furnace.

11. The incinerator assembly according to claim 10 further comprising a blower device coupled to said pipe for drawing the smoke out of said incinerator.

* * * * *